E. DUNSCOMB.
Oil Still.
No. 62,739.
Patented Mar. 12, 1867.
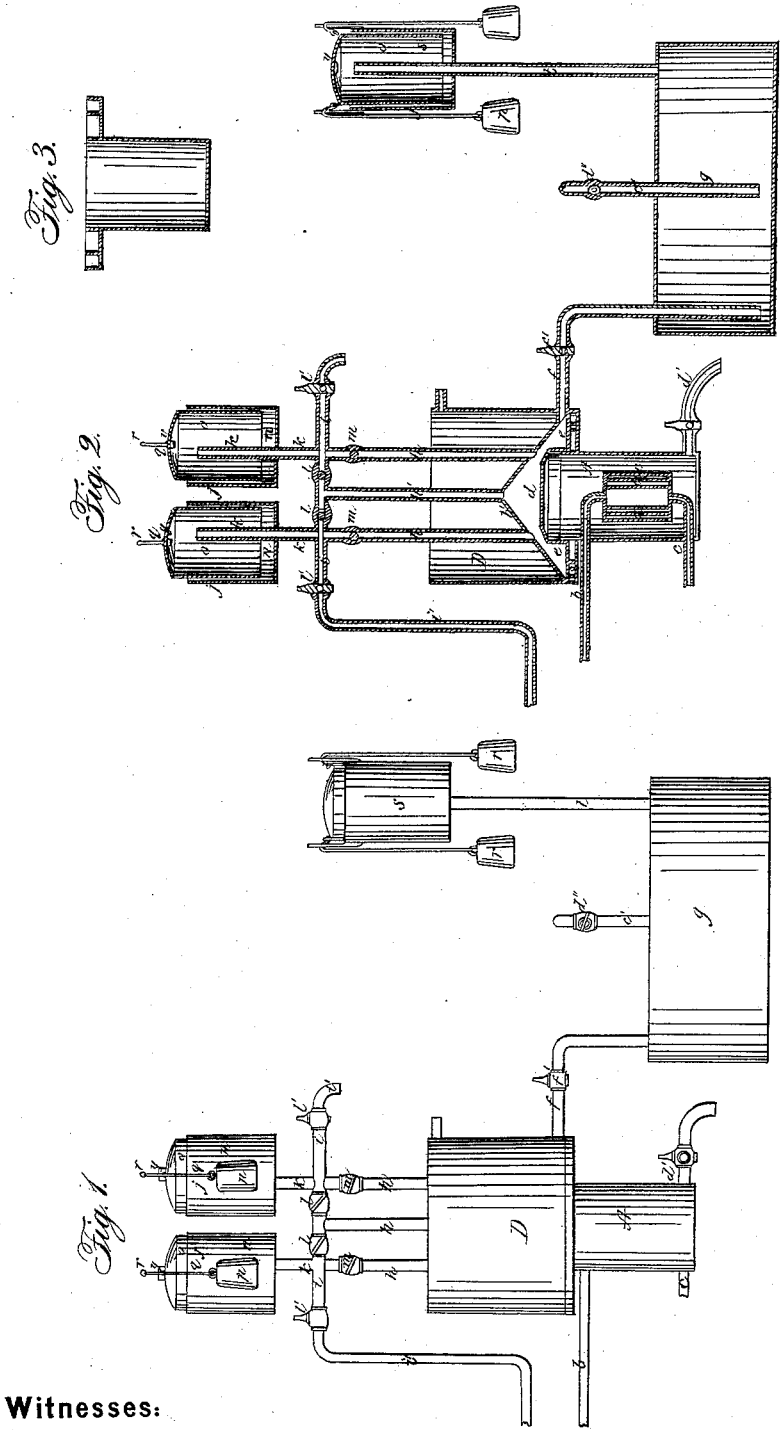
Witnesses:
Geo. D. Shattuck
John Smyth
Inventor:
Evan Dunscomb

United States Patent Office.

EDWARD DUNSCOMB, OF BOSTON, MASSACHUSETTS.

Letters Patent No. 62,739, dated March 12, 1867; antedated February 28, 1867.

---

IMPROVEMENT IN VACUUM-PUMPS, PANS, &c.

---

*The Schedule referred to in these Letters Patent and making part of the same.*

---

TO ALL WHOM IT MAY CONCERN:

Be it known that I, EDWARD DUNSCOMB, of the city of Boston, county of Suffolk, and Commonwealth of Massachusetts, have invented new and useful Improvements in Vacuum-Pumps, Vacuum-Pans, Vacuum-Stills, and Vacuum-Retorts, and hereby declare the following to be a full, clear, and exact description of the same, reference being had to the annexed drawings, making part of this specification, in which—

A denotes an air-tight closed pan to hold the substance to be distilled, having within it a generator, C composed of cylindrical vessel, C, closed at its ends, and with numerous tubes, $a\,a\,a\,a$, &c., running through in manner similar to an ordinary tubular boiler; but I confine myself not to tubular boiler, for in its stead a simple pipe may often be more advantageously used. $b$, a steam-induction pipe, leading from a steam boiler, (suitably situated,) passes through the side of A, and communicates with interior of generator C at its top. $c$, a condensed escape pipe, leads out of C to return to boiler, as feed-water, steam condensed (in C) by substance held in pan A to be distilled. D, condensing cistern, surmounts pan A; $b'$, lower part or bottom of D, is pyramidal or an inverted tunnel, forms a vacuum-dome, $d$, over A. Vapor arising from substance to be distilled contained in A, impinges against dome $d$, is condensed, runs down inner surface of $d$, is caught and retained in $e$, an annular trough within lower part of $d$. $f$, eduction pipe of $e$, is to carry off distillate from $e$, and is provided with a stop-cock, $f'$. $f$, the eduction pipe, leads into an air-tight tank, $g$, suitably situated to catch and store up the distillate; $f$ extends to nearly bottom of $g$, as shown in drawing 2. Upper part of D, or that above, also surrounding dome $d$, forms a cistern, D, to be ever kept filled with cold water, (or other condensing substance,) and has an overflow pipe at or near its top to carry off water used for condensation, which water, from suitable source, should unceasingly run into D, and is discharged after performing its functions of condensation through the overflow pipe. $h\,h'\,h$, vertical pipes unlimited in number, with ends open in dome $d$, extend upward out of $d$, and lead into a horizontal pipe, $i$, which is connected by vertical tubes, K K with two or more vacuum-pumps. $jj$, vacuum-pumps. $h\,h'\,h$ are condensers, indeed the chief condensers for vapor from A, impinging against $d$, should it not be condensed is drawn up $h\,h'\,h$, (which are surrounded by condensing substance of D,) therein condensed and runs down over $d$ into $e$. $i$ has stop-cocks, $l\,l'\,l'\,l$, on each side of pipes $h\,h$. $h\,h$ have stop-cocks, $m\,m$, between $d$ and $i$. $jj$ vacuum-pumps to draw up all vapor, (so soon as formed,) from pan A to dome $d$, to be there condensed; also, to draw up from $d$, through $h\,h'\,h$, all vapor not condensed in $d$ to be condensed in $h\,h'\,h$, &c., and run down over $d$ into $e$, also to draw up and store in bell $o$ all incondensable gas for utilization. Any required number of these vacuum-pumps and their pipes connected with dome $d$ may be employed; therefore, a description of the construction and operation of one vacuum-pump applies to each wherever located or for whatever purpose employed.

The Vacuum-Pump is formed of cistern $n$, (to be filled with water or other suitable substance,) and exhaust bell $o$, (rim of $o$ dips into the water of $n$,) and pipe $k$ extending up into interior of $n$, nearly to top of $n$. $k$ is surrounded by bell $o$, also by water of $n$. As open rim of $o$ dips into water of $k$, a water-tight joint is formed and prevents outward escape of gas from $o$, gas drawn up from pan A, and dome $d$, which gas is held in $o$, and prevented returning to $d$ by upward drawing of bell $o$, by its weights $p\,p$. This uninterrupted, continuous automatic upward pumping of vapor from A and $d$ forms perfect vacuum in dome $d$. To empty bell $o$ of gas so as to work it again as a vacuum-pump, the cock $l$ of pipe $i$, and cock $m$ of pipe $h$ are closed, and cock $l'$ of pipe $i$ opened, and weights $p\,p$ taken off, then bell $o$, by its gravity, descends into cistern $n$, and gas or incondensable vapor is expelled from $o$, through pipes $k$ and $i$, and pipe $i'$, into burners for illumination or caloric producing ascent of $o$. During time of descent of $o$, above described, cocks $m\,l$, of pipes $h\,i$, of other bell $o$ are opened, and cock $l$, of $i$, is closed, and weights $p\,p$ hung on to $o$; this bell $o$ now ascends, being drawn up by its weights $p\,p$, and, by its upward ascent, exhausts, from A to $d$, all vapor, and pumps up into itself all incondensable vapor or gas from $d$, through pipes $h\,h'$ and $k$.

To Work the Vacuum-Pump.

$p\,p$, weights, are connected with bell $o$ by cords, $q\,q$, passing through guides or eyes, $r\,r$, extended above cistern $n$, as shown in the drawings, whereby bell $o$ is drawn up, and pumps from A all vapor, so soon as formed, into $d$, there to be condensed, and from $d$ into $h\ h'\ h$, to condense what $d$ could not condense, and from $h\ h'\ h$ all incondensable gas into $o$, there to be stored for utilization. To empty bell $o$ of air, previous to work, cap $y$ is taken off, and weights $p\ p$ taken off. $o$, by its gravity, descends, and all air in $o$ is driven out through $y$.

To Distill.

Pan A is nearly filled with substance to be distilled, air-tight joint in any usual way made between A and D, cap $y$ screwed on to $o$, cocks $l'\ l'$ and $f'$ are closed, cocks $l$ and $m$ are opened, weights $p\ p$ hung on to bell $o$, and draw up $o$, which exhausts into itself, by its upward motion, all air from A and $d$. Vacuum is now established in A and $d$, and the air thus pumped out of A and $d$ must be expelled from $o$. Cocks $l\ l'$ and $m$ are closed, and cap $y$ taken off; bell $o$, as before described, descends, and drives out all air from $o$. The air in tank $g$ is in like manner exhausted by its vacuum-pump, and in like manner expelled from $o$. During this operation cocks $f'$ and $d'$ are closed. Tank $g$, pan A, and dome $d$ are now pumped free of air, and vacuum established, and steam let on, through $b$, into generator C, where it is condensed, (by fluid contained in A to be distilled,) and returns as feed-water into boiler through $c$. Distillation is now active and very rapid. As fast as vapor is formed, vacuum previously established, as before described, is kept up by the pumps, and vapor rushes and is drawn up to condensing dome $d$, against which it impinges, is condensed, and falls into $e$. Such portion as is not condensed is drawn up, by the pumps, into $h\ h'\ h$, there condensed, and falls down, over $d$, into $e$. To empty $e$ into tank $g$, open cock $f'$, and vacuum previously established in tank $g$ draws down from $e$, the distillate, and the vacuum-pumps of tank $g$ being kept at work, as previously described, keep $e$ empty and fill tank $g$. Thus at the same time are established, at different and widely separated points, two distinct vacua, one above, the other below the trough $e$ and dome $d$, and kept unremittingly in continuous operation. Should cock $f$ open directly into surrounding atmosphere, vacuum in A and $d$ would be broken by inrush of air through $f'$, also incondensable gas escape, be lost by mingling with other atmosphere, become source of danger by contact with fire, and consequent explosion, as is the case ofttimes in distillation of petroleum and coal oil by ordinary method, and delivery of distillate from tail-piece, or delivery mouth of the condensing worm, into the open atmosphere, when incondensable gas is from the delivery mouth delivered into outer atmosphere, also very light benzole delivered from tail-piece into outer atmosphere, is again vaporized and seen as visible gas, rising and mingling with outer atmosphere, constant source of loss and danger. By my process, from the time the material to be distilled is put into A and distillation completed, all is hermetically sealed, and explosion of still, or from flame of lighted lamp in still-house, is impossible. $g$, an air-tight tank, should have two or more pumps, one of which is seen at S, in drawing number 1–2. $g$ is used to store up distillate; also, by its vacuum-pump, as before described, to empty $e$. Tank $g$ has a pipe, $c'$, with its cock $d'$; $c'$ runs down nearly to the bottom of $g$; the functions of $c'\ d'$ are to gasefy all light oil contained in tank $g$. To work $c'\ d'$, open the cock $d'$; put the vacuum-pump of $g$ into operation; air from the outer atmosphere is drawn down $c'$, and frees itself at the lowest end of $c'$ into the lamp oil stored up in tank $g$. Air so freed rises up through the oil of $g$, and in its upward motion absorbs, takes up, and gasefies all light oil and benzole of tank $g$. The vacuum-pump of $g$ draws up and stores in its bell $o$, as gas, the benzole thus separated from the lamp oil, and the lamp oil is thus freed of its dangerous element, benzole. After this operation, cock $d'$ of pipe $c'$ is closed. To retort oil from coal or shale, fill A with coal or shale instead of oil; work the apparatus as before described. This is the cheapest, safest, speediest, cleanest, and best method of retorting oil from coal or shale. Figure 3, of the drawings, shows a pan like A, but without the generator $c$, for retorting coal into oil, or distilling oil into lamp oil, not by steam but by direct action of caloric, either from the ordinary furnace placed under A, or from generating caloric from gas stored up in the bells $o\ o$. In all other respects it is worked with its vacuum-pumps and tank $g$ as described for A C. The pan A has an outlet pipe, $d'$, at its bottom to discharge residuum after the process of distillation.

The advantages of this apparatus are too many to enumerate; to the theoretical and practical chemist, as required, they will be seen and appreciated; but among them are rapid distillation, small cost for caloric; 90° of Fahrenheit takes over the light oil, variously called gasoline, benzoline, benzine, benzole, naphtha, &c., and by this method only can the lightest be caught and secured, for by the ordinary mode of distillation, after the lightest has been condensed as it comes from mouth of tail-piece or worm delivery into the open atmosphere, it is again vaporized, and is seen rising as visible gas, which is lost also; enters into surrounding atmosphere, mixes therewith as most dangerous element of explosive gas. Increase volume of steam raises contents of pan A to 150° Fahrenheit—lamp oil is brought over. Continue to increase volume of steam until contents of pan A mark 212° Fahrenheit—lubricating oil is brought over. The still bottoms are never coked nor tenaciously adhere to sides or bottom of the pan or retort. The naphtha and lamp oil come over odorless and colorless, transparent, translucent; save the expense of vessels wherein to treat the oil after distillation; save expense of power to work agitators, deodorizers, washers, &c., &c.; save cost of mineral acids, of alkalies, &c., &c. The oil not being "treated" either before or after distillization is not carbonized by the acids, consequently richer in illumination. A gallon of oil so made gives many per cent. more illumination than a gallon of "treated" oil as tested by photometer. Benzole is more useful than benzole of ordinary method, which to deodorize it has been treated, is never perfectly free of acid, very often curdles paint when substituted for spirits turpentine; as menstruum for gum acts feebly; on some gums will not act; employed to thin down varnish often curdles the varnish. By my process, the benzole is never "treated," consequently not subject to these ruinous results, and does its work. Vacuum-pans with their pumps have been employed to distill petroleum; the pumps are very costly, and, worked by steam power, very expensive; the oil so taken off was odorless, colorless, and excellent in quality. The common vacuum-pump is very costly, valves easily "out of order;" the burning hot vapors from the still act so injuriously on the valves as to cause the employment of the common vacuum-pump impracticable, and when employed, as do all other vacuum-pumps, require the labor of a skilled hand at high pay to work them.

My pumps are cheap in cost, so simple that a child can work them; almost impossible to put out of order; not any valves to wear out or ruin and made useless by action on the valve of burning hot vapor. My pumps are automatic, working the instant they are needed, cease work the instant they are not needed. My vacuum is perfect, uninterruptedly continuous. My method catches and stores up for utilization every particle of incondensable gas; never loses by again vaporizing the benzole. My method prevents pressure on the retort, also on still, is free of danger (by pressure on still or retort) of explosion. My method is useful to the corner street apothecary or druggist; economically and safely worked on small scale, a pint or half-pint still; and in many preparations the alcohol now lost in vapor after its work, is retained and saved for future work.

*Claims.*

1. I claim the air-induction pipe $c'$, with its stop-cock $d'$, applied to the air-tight tank $g'$, for the purpose described, substantially as set forth.

2. I also claim the pipe $f$, with its stop-cock $f'$, as applied to tank $g$ and trough $e$, as before described.

3. I also claim the employment of the generator C, in combination with the condenser D, and pipes $h$ and $k$, and vacuum-pumps $j\,j$, substantially as set forth.

4. I also claim, in combination with the condensing apparatus before described, the air-tight tank $g$, in the manner and for the purpose set forth.

5. I also claim the combination of the condensing dome $d$, and trough $e$, with pipes $h\,i\,k$, and vacuum-pumps $j\,j$, essentially as set forth and explained.

EDWARD DUNSCOMB.

Witnesses:
JAMES SKINNER,
C. H. GRIFFIN.